(12) United States Patent
Rhoney et al.

(10) Patent No.: US 6,922,511 B2
(45) Date of Patent: Jul. 26, 2005

(54) FIBER OPTIC ASSEMBLIES AND CABLES HAVING SUBUNITS WITH A SECURITY FEATURE

(75) Inventors: Brian K. Rhoney, Hickory, NC (US); Samuel D. Nave, Conover, NC (US); James A. Register, III, Hickory, NC (US); William M. Hobbs, Arlington, VA (US); Jill D. McPeak, Denver, NC (US); Roderick S. Bayliss, Jr., Athens, GA (US)

(73) Assignee: Corning Cable Systems LLC, Hickory, NC (US)

( * ) Notice: Subject to any disclaimer, the term of this patent is extended or adjusted under 35 U.S.C. 154(b) by 52 days.

(21) Appl. No.: 10/403,327

(22) Filed: Mar. 31, 2003

(65) Prior Publication Data

US 2004/0190842 A1 Sep. 30, 2004

(51) Int. Cl.$^7$ .................................................. G02B 6/44
(52) U.S. Cl. ........................ 385/106; 385/101; 385/102; 385/103
(58) Field of Search ................................. 385/102, 101, 385/100, 103, 104, 105, 106, 109, 110

(56) References Cited

U.S. PATENT DOCUMENTS

| | | | |
|---|---|---|---|
| 4,906,067 A | 3/1990 | Mayr et al. ............... 350/96.23 |
| 5,062,685 A | 11/1991 | Cain et al. ............... 350/96.23 |
| 5,224,191 A | 6/1993 | Zeidler ......................... 385/111 |
| 5,229,851 A * | 7/1993 | Rahman ...................... 385/114 |
| 5,343,549 A | 8/1994 | Nave et al. .................. 385/103 |
| 5,408,562 A * | 4/1995 | Yoshizawa et al. ......... 385/112 |
| 5,566,266 A | 10/1996 | Nave et al. .................. 285/113 |
| 5,748,823 A | 5/1998 | Nave ........................... 385/113 |
| 5,857,051 A * | 1/1999 | Travieso et al. ............ 385/114 |
| 6,167,178 A | 12/2000 | Nave ........................... 385/103 |
| 6,215,932 B1 | 4/2001 | Hardwick, III et al. ..... 385/114 |
| 6,226,431 B1 * | 5/2001 | Brown et al. ............... 385/114 |
| 6,292,611 B1 * | 9/2001 | Chamberlain et al. ...... 385/114 |
| 6,301,413 B1 | 10/2001 | Bringuier ..................... 385/100 |
| 6,317,542 B1 | 11/2001 | Hardwick, III et al. ..... 385/114 |
| 6,317,543 B1 * | 11/2001 | Sheu ........................... 385/114 |
| 6,321,013 B1 * | 11/2001 | Hardwick et al. .......... 385/114 |
| 6,404,962 B1 | 6/2002 | Hardwick, III et al. ..... 385/114 |
| 6,487,348 B1 | 11/2002 | Jackson ...................... 385/114 |
| 6,671,441 B1 * | 12/2003 | Bocanegra et al. ......... 385/112 |
| 2003/0059182 A1 * | 3/2003 | Johnson et al. ............. 385/112 |
| 2003/0118295 A1 * | 6/2003 | Lail et al. .................... 385/101 |

OTHER PUBLICATIONS

Fitel, "MPO Connector", 2001.

* cited by examiner

*Primary Examiner*—Chandrika Prasad
(74) *Attorney, Agent, or Firm*—Michael E. Carroll, Jr.

(57) ABSTRACT

One embodiment is a fiber optic cable including at least one subunit, a tube, a plurality of strength members, and a cable jacket. The subunit includes a fiber optic ribbon and a sheath, wherein the sheath is tight-buffered about the fiber optic ribbon, thereby inhibiting buckling of the ribbon during temperature variations. The tube houses at least a portion of the at least one subunit to form a tube assembly. The plurality of strength members are disposed radially outward of the tube and are surrounded by the cable jacket. Other embodiments include a plurality of subunits in a stack with each subunit having a sheath for security purposes. Additionally, a tube assembly can have a fiber optic packing density of about 0.05 or greater.

32 Claims, 2 Drawing Sheets

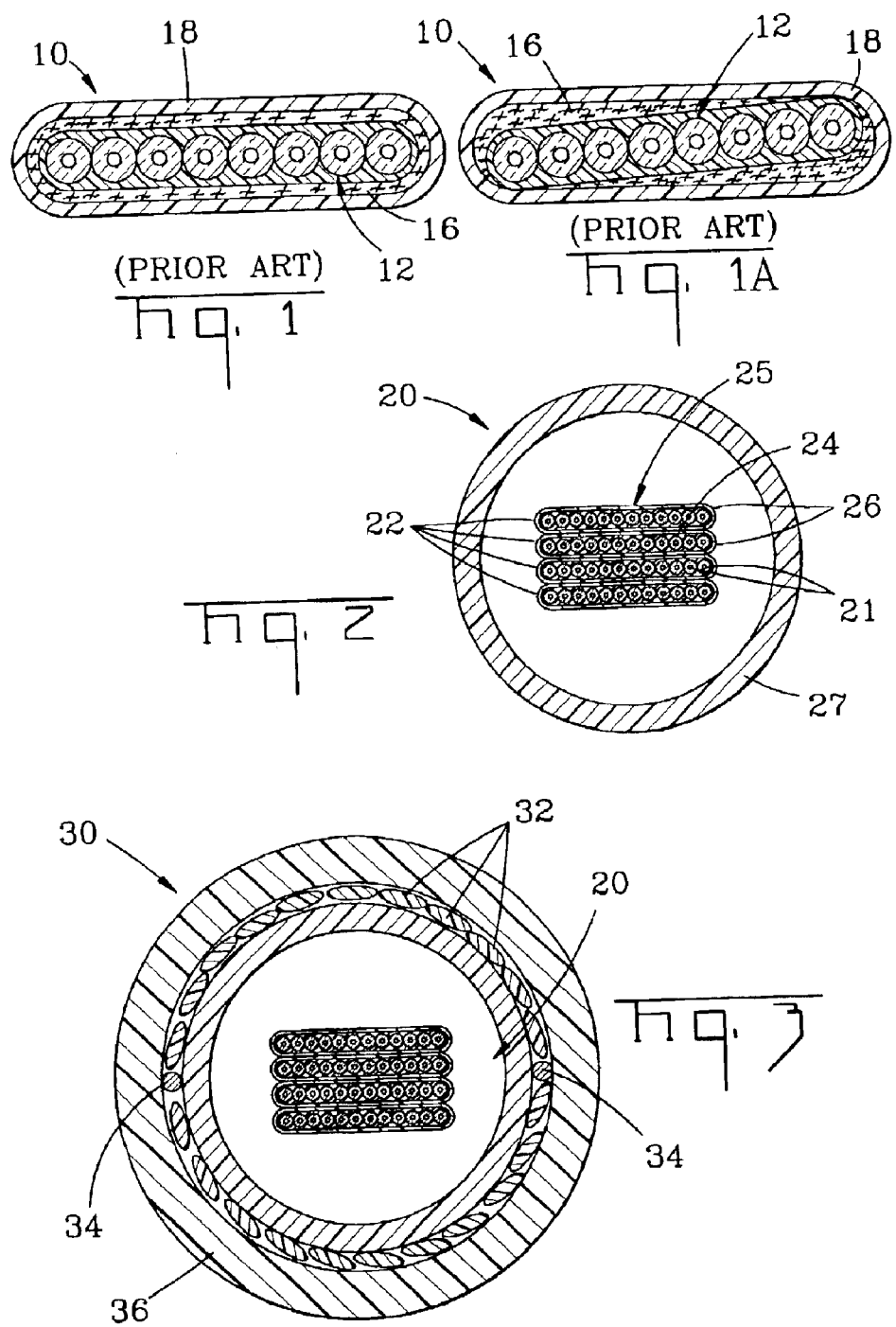

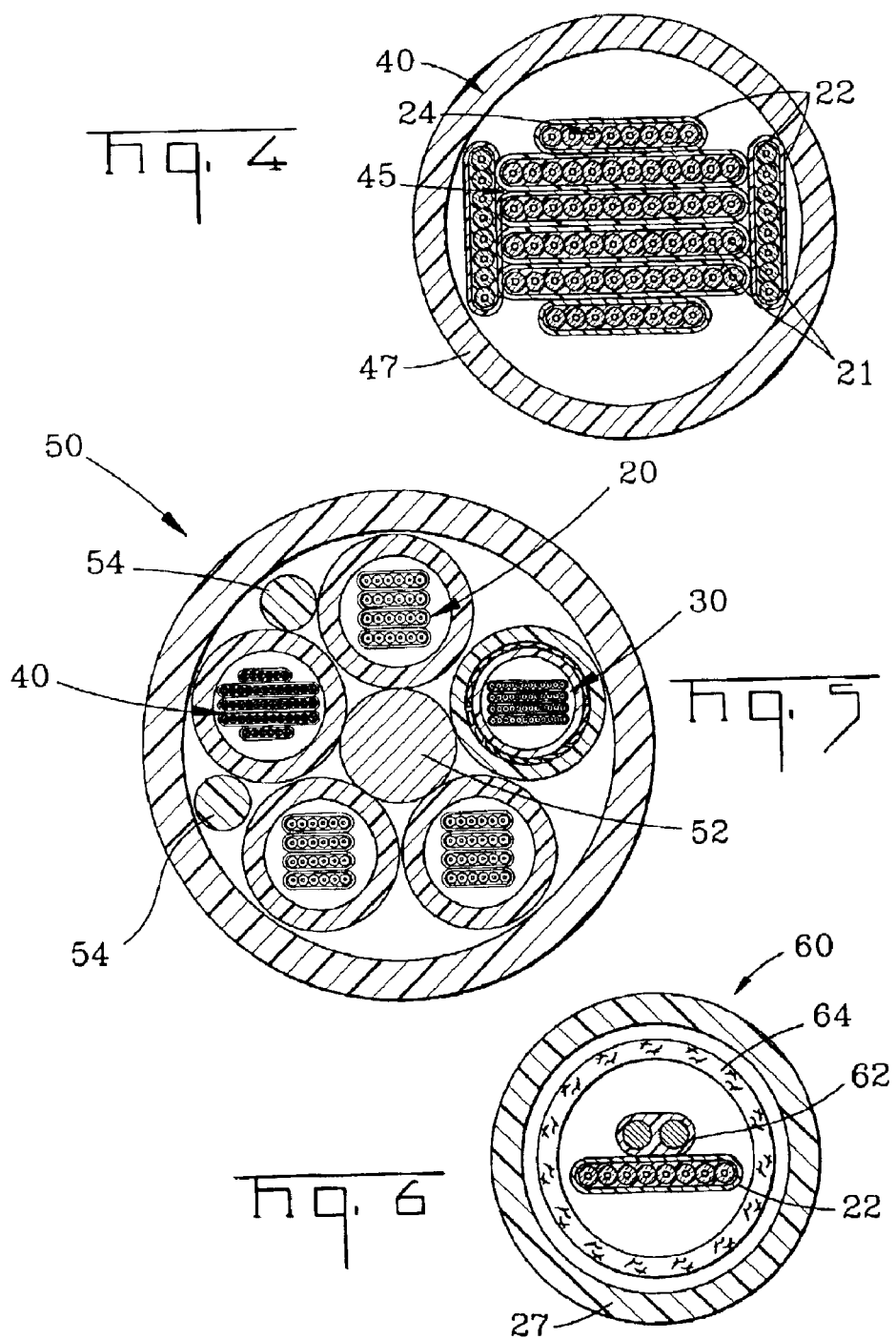

FIBER OPTIC ASSEMBLIES AND CABLES HAVING SUBUNITS WITH A SECURITY FEATURE

FIELD OF THE INVENTION

The present invention relates generally to fiber optic assemblies and cables. More specifically, the invention relates to breakout fiber optic assemblies and cables having a security feature.

BACKGROUND OF THE INVENTION

Optical cables include optical waveguides such as optical fibers that transmit optical signals such as voice, video, and/or data information. One type of fiber optic cable is a breakout fiber optical cable. A breakout fiber optic cable generally includes several protected structures that are capable of being broken-out from an assembly or cable and run to desired locations for optical connection.

U.S. Pat. No. 5,857,051 is an example of a breakout fiber optic cable that discloses a plurality of optical fiber ribbon structures in a tube. As depicted in FIG. 1, an optical fiber ribbon structure 10 requires a fiber optic ribbon 12 and a plurality of strength members 16 surrounded by a relatively loose sheath 18. Strength members 16 are aramid fibers that are used to protect a plurality of optical fibers 12a of fiber optic ribbon 12 from breakage due to tensile forces applied to the optical fiber ribbon structure 10. The fiber optic cable can include flame-retardant materials for riser or plenum applications; however, this cable has disadvantages.

For example, since sheath 18 is relatively loosely disposed around the optical fiber ribbon 12, ribbon 12 can rotate relative to sheath 18 as depicted in FIG. 1a. Stated another way, when the ribbon structures are stranded within the tube, portions of optical fiber ribbon 12 can twist and contact the inner wall of sheath 18 causing local stress points. These local stress points can cause undesired optical attenuation in the optical fibers adjacent to the local stress point and may even render the optical fibers inoperable. Additionally, when subject to temperature variations, sheath 18 can shrink which can cause stresses and/or strains on optical fiber ribbon 12. For instance, the shrinking sheath 18 can cause a compressive force that undulates or buckles optical fiber ribbon 12 along its length, thereby causing undesired optical attenuation. Additionally, optical fiber ribbon structure 10 has a relatively large cross-sectional area that generally decreases the number of optical fibers that can fit within the tube.

SUMMARY OF THE INVENTION

The present invention is directed to a fiber optic cable including at least one subunit, a tube, a plurality of strength members, and a cable jacket. The at least one subunit includes a fiber optic ribbon and a sheath, wherein the sheath is tight-buffered about the fiber optic ribbon, thereby inhibiting buckling of the ribbon during temperature variations. The tube houses at least one subunit to form a tube assembly and a plurality of strength members are disposed radially outward of the tube. A cable jacket generally surrounds the tube and strength members.

The present invention is also directed to a fiber optic cable including a plurality of subunits, a tube, at least one strength member, and a cable jacket. The plurality of subunits each includes a respective fiber optic ribbon and a respective sheath that is tight-buffered about the respective fiber optic ribbon. The plurality of subunits form a subunit stack that is stranded within at least a portion of the tube, thereby forming a tube assembly. The fiber optic cable also includes at least one strength member and a cable jacket.

The present invention is further directed to a tube assembly including a plurality of subunits and a tube. The plurality of subunits each includes a respective fiber optic ribbon and a respective sheath that is tight-buffered about the respective fiber optic ribbon. The plurality of subunits form a subunit stack that is stranded and housed within at least a portion of the tube. Additionally, the tube assembly has a fiber optic packing density of about 0.05 or greater.

BRIEF DESCRIPTION OF THE FIGS

FIG. 1 is a cross-sectional view of a conventional optical fiber ribbon structure.

FIG. 1a is a cross-sectional view of the optical fiber ribbon structure of FIG. 1 depicting the optical fiber ribbon rotating relative to the sheath.

FIG. 2 is a cross-sectional view of a fiber optic assembly according to the present invention.

FIG. 3 is a cross-sectional view of the fiber optic assembly according to FIG. 1 used as a portion of a fiber optic cable.

FIG. 4 is a cross-sectional view of another fiber optic assembly according to the present invention.

FIG. 5 is a cross-sectional view of another fiber optic cable having a fiber optic assembly according to the present invention.

FIG. 6 is a cross-sectional view of a fiber optic assembly having an electrical component according to the present invention.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

FIG. 2 depicts a tube assembly 20 according to the present invention having at least one subunit 22 disposed in a tube 27 that houses at least a portion of subunit 22. Each subunit 22 includes a single fiber optic ribbon 24 (hereinafter ribbon) surrounded by a sheath 26 that is tight-buffered thereon to couple sheath 26 and ribbon 24, thereby inhibiting ribbon 24 from twisting relative to sheath 26 and generally protecting ribbon 24. As used herein, tight-buffered means that the sheath may contact at least a portion of the ribbon and excludes strength members inside the sheath; however, tight-buffered configurations can include a thin layer(s) and/or film(s) disposed between the ribbon and the sheath. Thin layers or films can include a talc powder, a water-swellable material, a tape, or other suitable materials; however, any thin layer or film should not inhibit coupling between sheath 26 and ribbon 24. Tight-buffering each ribbon 22 improves buckling resistance compared with a loose sheath as shown in FIG. 1. Furthermore, tight-buffering of ribbon 24 provides a security feature as will be discussed.

In the embodiment depicted, a plurality of subunits 22 are stacked to form a subunit stack 25. Preferably, subunit stack 25 is stranded within tube 27. Stranding can be helical, S-Z, or other suitable stranding configurations. Additionally, tube assembly 20 can be a portion of a fiber optic cable and/or include other suitable components or features such as a water-swellable component, a ripcord in the tube wall, unsheathed ribbons, and/or an electrical component.

In this case, fiber optic ribbons 24 include a plurality of optical fibers 21, more specifically, single-mode optical fibers connected by a matrix material as known in the art. However, other suitable types or configurations of optical fibers/ribbons can be used. For example, optical fibers 21 can be multi-mode, pure-mode, erbium doped, polarization-maintaining fiber, other suitable types of light waveguides, and/or combinations thereof. For instance, each optical fiber 21 can include a silica-based core (not numbered) that is operative to transmit light and is surrounded by a silica-based cladding (not numbered) having a lower index of refraction than the core. Additionally, one or more coatings can be applied to optical fiber 21. For example, a soft primary coating (not numbered) surrounds the cladding, and a relatively rigid secondary coating (not numbered) surrounds the primary coating. The coating can also include an identifying means such as ink or other suitable indicia for identification and/or an anti-adhesion agent that inhibits the removal of the identifying means. Suitable optical fibers are commercially available from Corning Incorporated of Corning, N.Y.

Sheath 26 is preferably constructed of a polymeric material. More preferably, sheath 26 is constructed of flame-retardant material so that tube assembly 20 is useful for plenum or riser applications. Suitable flame-retardant materials include polyvinyl chloride (PVC), polyvinylidene fluoride (PVDF), flame-retardant polyethylene (FRPE), but other suitable flame-retardant materials can be used. Likewise, tube 27 is preferably constructed of a polymeric material, more preferably a flame-retardant material.

Sheath 26 is preferably tight-buffered about a respective ribbon 24 so that sheath 26 and the respective ribbon 24 are coupled together. Coupling the two components together creates a relatively robust subunit that can be stranded with a predetermined lay length without causing undue optical attenuation. In other words, stranding subunits does not cause local stress and/or strain on ribbon 24 since ribbon 24 generally is not free to rotate relative to sheath 26. Moreover, since sheath 26 and ribbon 24 are coupled together sheath 26 is inhibited from shrinking due to temperature variations. In other words, the two components act as a unit to inhibit buckling, rather than the sheath having relatively large shrinkage relative to the ribbon, which causes undulations and/or buckling of the ribbon and create undesirable optical attenuation. Moreover, a thickness of sheath 26 is as thin as possible while still providing adequate protection and buckling resistance, rather than being relatively thick or foamed, which increases the thickness and space required. Stated another way, a smaller subunit allows more subunits to fit within a predetermined space. By way of example, sheath 26 has a thickness of about 0.3 mm or less; however, other suitable dimensions are possible.

Packing efficiency of the optical fibers in a tube can be calculated and compared using a fiber optic packing density. As used herein, fiber optic packing density is defined as the ratio of a sum of the cross-sectional areas of the optical fibers within a tube divided by an area bounded by an inner diameter (ID) of the tube. Using subunits 22 that are tight buffered generally improves both optical performance and the fiber optic packing density of tube assembly 20. For instance, tube assembly 20 has four ribbons 24 each having twelve optical fibers 21 with a nominal outer diameter of 250 microns for a total of optical fiber area of about 2.4 mm$^2$ within tube 27. Tube 27 has an ID of about 6.0 mm for an area of about 28.3 mm$^2$. Thus, in this case, the fiber optic packing density is 0.08. By way of example, the fiber optic packing density of the embodiments of the present invention are generally in the range of about 0.05 to about 0.14; however, other suitable ranges are possible. On the other hand, a tube assembly with the same 6.0 mm ID tube can only effectively accommodate a single twelve-fiber subunit of the type shown FIG. 1. This tube assembly has a fiber optic packing density of 0.02, which is about one-quarter of the fiber optic packing density of tube assembly 20.

Additionally, sheath 26 provides a security feature by surrounding ribbon 24, thereby making tapping an optical signal from an optic fiber more difficult and easier to detect. In other words, a portion of sheath 26 must be removed to midspan access ribbon 24 after subunits 22 are broken away from tube assembly 20. Moreover, detecting tampering with ribbon 24 is easier because a craftsman can inspect sheath 26 along its length for any tampering therewith. Furthermore, each sheath can include a marking indicia (not shown) for identification of a particular subunit for routing/connectorization purposes. For instance, the marking indicia can be characters printed on sheath 26, different colored sheaths 26, or other suitable marking indicia.

FIG. 3 depicts a fiber optic breakout cable 30 that employs tube assembly 20, a plurality of strength members 32, at least one ripcord 34, and a cable jacket 36. As depicted, strength members 32 are generally disposed radially outward of tube 27; however, other cable configurations can dispose strength members in other suitable locations such as within a tube or jacket wall. Additionally, the cable can have either a preferential or non-preferential bend characteristic. In this embodiment, strength members 32 are preferably impregnated fiberglass yarn strands; however, any other suitable tensile yarns or materials can be used such as aramid yarns. More preferably, strength members 32 are stranded around tube 27 in one or more layers, thereby providing coverage of tube 27 to inhibit cable jacket 36 from bonding thereto. Additionally, this embodiment includes two ripcords 34 disposed within cable jacket 36 for aiding the craftsman in removing cable jacket 36. Cable jacket 36 is preferably formed from a flame-retardant material so that breakout cable 30 has a plenum or riser rating; however, any other suitable materials can suffice such as polyethylene or polypropylene. Cable jacket 36 can also include a marking indicia thereon for identifying the cable.

One plenum-rated embodiment of cable 30, uses a PVC for sheath 26 and tube 27 and a PVDF for cable jacket 36. More specifically, sheath 26 and tube 27 is formed from a PVC available from AlphaGary Corporation of Leominster, Mass. under the tradename 8570-L, and cable jacket 36 is formed from a PVDF available from Solef Solvay of Houston, Tex. under the tradename 31008-0003. However, other suitable combinations of materials and/or blends are possible for use in plenum or riser applications.

FIG. 4 depicts tube assembly 40, which is another embodiment according to the present invention that is similar to tube assembly 20. Tube assembly 40 includes a plurality of subunits 22 in a subunit stack 45 that are at least partially disposed within a tube 47. In this embodiment, at least two of the subunits have a different number of optical fibers 21 in the respective ribbons 24. This allows for a greater fiber optic packing density within tube assembly 40 by having the profile of subunit stack 45 being stepped to conform to a profile of tube 47. In this case, tube 47 has a round inner profile and subunit stack 45 is configured to conform to, and fill, this shape. Specifically, tube assembly 40 has eighty 250-micron optical fibers in a tube having an inner diameter of about 6.0 mm. More specifically, tube assembly 40 includes four twelve-fiber ribbons and four eight fiber ribbons orientated in two different directions. Thus, the optical fiber packing density is about 0.14. In other embodiments, fiber optic packing density can be increased by selecting the geometry of the tube assembly, for example, a rectangular or square tube is used to more closely match respective rectangular or square subunit stack profiles.

The tube assemblies of the present invention can also be used in other suitable fiber optic cable designs. FIG. 5 illustrates fiber optic cable 50, which includes a plurality of tube assemblies 20, 30, and 40 stranded about a central member 52 with a cable jacket 56 therearound. Preferably, central member 52 is a central strength member such as a glass-reinforced plastic or steel wire for providing tensile strength. Cable 50 can also include a plurality of filling rods 54 for maintaining the cable shape. Additionally, cable 50 can include other suitable components such as binder threads, tensile yarns, water-swellable materials, armor, electrical components, or other suitable cable components. For instance, an electrical component can be disposed in the interstices between tube assemblies or within a tube. Other cable configurations that use a central member are also possible. For example, a central member 52 can have a plurality of subunits 22 stranded therearound (not shown) with a layer such as a tape or strength members further stranded about subunits 22 and a jacket disposed around the same.

FIG. 6 depicts another tube assembly 60 according to the present invention. This embodiment includes at least one subunit 22, at least one electrical component 62, and a water-swellable substance 64 all which are at least partially disposed within tube 27. Electrical component 62 can include one or more electrical conductors, a coaxial cable, or combinations thereof. In this embodiment, electrical component 62 is a pair of electrical conductors and water-swellable substance 64 is a water-swellable tape. Water-swellable tape is generally wrapped about subunit 22 and electrical component 62 and can have a binder thread for securing the same. Additionally, other suitable components can be included within tube 27.

Many modifications and other embodiments of the present invention, within the scope of the appended claims, will become apparent to a skilled artisan. For instance, tube assemblies or cables can include configurations with other components such as strength members, ripcords, water-swellable materials, armor, electrical components, or other suitable components. Additionally, the concepts of the present invention are useful with other cable configurations besides monotube, and stranded tube configurations such as a slotted core cable. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides and/or fiber optic cable configurations as well.

That which is claimed:

1. A fiber optic cable comprising:
    at least one subunit, the subunit including a fiber optic ribbon and a sheath, wherein the sheath is tight-buffered about the fiber optic ribbon, thereby inhibiting buckling of the ribbon during temperature variations;
    a tube, the tube housing at least a portion of the at least one subunit, thereby forming a tube assembly;
    a plurality of strength members, the plurality of strength members being disposed radially outward of the tube; and
    a cable jacket, the cable jacket generally surrounding the tube and the plurality of strength members.

2. The fiber optic cable of claim 1, the at least one subunit being a portion of a subunit stack, the subunit stack including at least two subunits having a different number of optical fibers in the respective ribbons of the at least two subunits for increasing a fiber optic packing density of the tube assembly.

3. The fiber optic cable of claim 1, further comprising a plurality of subunits, each subunit having a respective ribbon and a respective sheath that is tight-buffered about the fiber optic ribbon, wherein the plurality of subunits form a subunit stack that is stranded within the tube.

4. The fiber optic cable of claim 1, the cable jacket being formed from a polyvinylidene fluoride (PVDF) material.

5. The fiber optic cable of claim 1, the tube being formed from a polyvinylchloride (PVC) material.

6. The fiber optic cable of claim 1, the sheath and the tube being formed from a polyvinylchloride (PVC) material and the cable jacket being formed from a polyvinylidene fluoride (PVDF) material.

7. The fiber optic cable of claim 1, the cable further comprising at least one ripcord.

8. The fiber optic cable of claim 1, the tube assembly having a fiber optic packing density of about 0.05 or greater.

9. The fiber optic cable of claim 1, further comprising an electrical component.

10. The fiber optic cable of claim 1, the tube assembly being stranded about a central member.

11. The fiber optic cable of claim 1, further comprising a first subunit having a respective sheath of a first color and a second subunit having a respective sheath of a different color.

12. The fiber optic cable of claim 1, some of the plurality of strength member being fiberglass yarn strands.

13. A fiber optic cable comprising:
    a plurality of subunits, the plurality of subunits each including a respective fiber optic ribbon and a respective sheath that is tight-buffered about the respective fiber optic ribbon, wherein the plurality of subunits form a subunit stack that is stranded;
    a tube, the tube housing at least a portion of the subunit stack, thereby forming a tube assembly;
    at least one strength member; and
    a cable jacket, the cable jacket generally surrounding the tube and the at least one strength member.

14. The fiber optic cable of claim 13, the subunit stack having at least two subunits with the respective ribbons of the at least two subunits having a different number of optical fibers in the respective ribbons for increasing fiber optic packing density of the tube assembly.

15. The fiber optic cable of claim 13, the cable jacket being formed from a polyvinylidene fluoride (PVDF) material.

16. The fiber optic cable of claim 13, the tube being formed from a polyvinylchloride (PVC) material.

17. The fiber optic cable of claim 13, the sheath and the tube being formed from a polyvinylchloride (PVC) material and the cable jacket being formed from a polyvinylidene fluoride (PVDF) material.

18. The fiber optic cable of claim 13, the cable further comprising at least one ripcord.

19. The fiber optic cable of claim 13, the tube assembly having a fiber optic packing density of about 0.05 or greater.

20. The fiber optic cable of claim 13, further comprising an electrical component.

21. The fiber optic cable of claim 13, the tube assembly being stranded about a central member.

22. The tube assembly of claim 13, a first respective sheath of a first subunit having a first color and a second respective sheath of a second subunit having a different color.

23. The tube assembly of claim 13, the tube assembly being a portion of a cable, the cable having a plurality of fiberglass strength members disposed about the tube assembly and a cable jacket, the cable jacket generally surrounding the tube assembly.

24. A tube assembly comprising:
   a plurality of subunits, the plurality of subunits each including a respective fiber optic ribbon and a respective sheath that is tight-buffered about the respective fiber optic ribbons wherein the plurality of subunits form a subunit stack that is stranded;
   a tube, the tube housing at least a portion of the a plurality of subunits, wherein the tube assembly has a fiber optic packing density of about 0.05 or greater.

25. The tube assembly of claim 24, the tube being stranded about a central member.

26. The tube assembly of claim 24, the tube assembly being a portion of a cable.

27. The tube assembly of claim 24, the sheaths of the plurality of subunits being formed from a flame-retardant material.

28. The tube assembly of claim 24, the tube being formed from a flame-retardant material.

29. The tube assembly of claim 24, the subunit stack having at least two subunits with the respective ribbons of the at least two subunits having a different number of optical fibers in the respective ribbons.

30. The tube assembly of claim 24, further comprising an electrical component.

31. The tube assembly of claim 24, a first respective sheath of a first subunit having a first color and a second respective sheath of a second subunit having a different color.

32. The tube assembly of claim 24, the tube assembly being a portion of a cable, the cable having a plurality of fiberglass strength members disposed about the tube assembly and a cable jacket, the cable jacket generally surrounding the tube assembly.

* * * * *